March 27, 1956 R. F. GAMUNDI 2,739,683
MAGNETIC DRIVE
Filed Jan. 21, 1953 2 Sheets-Sheet 1
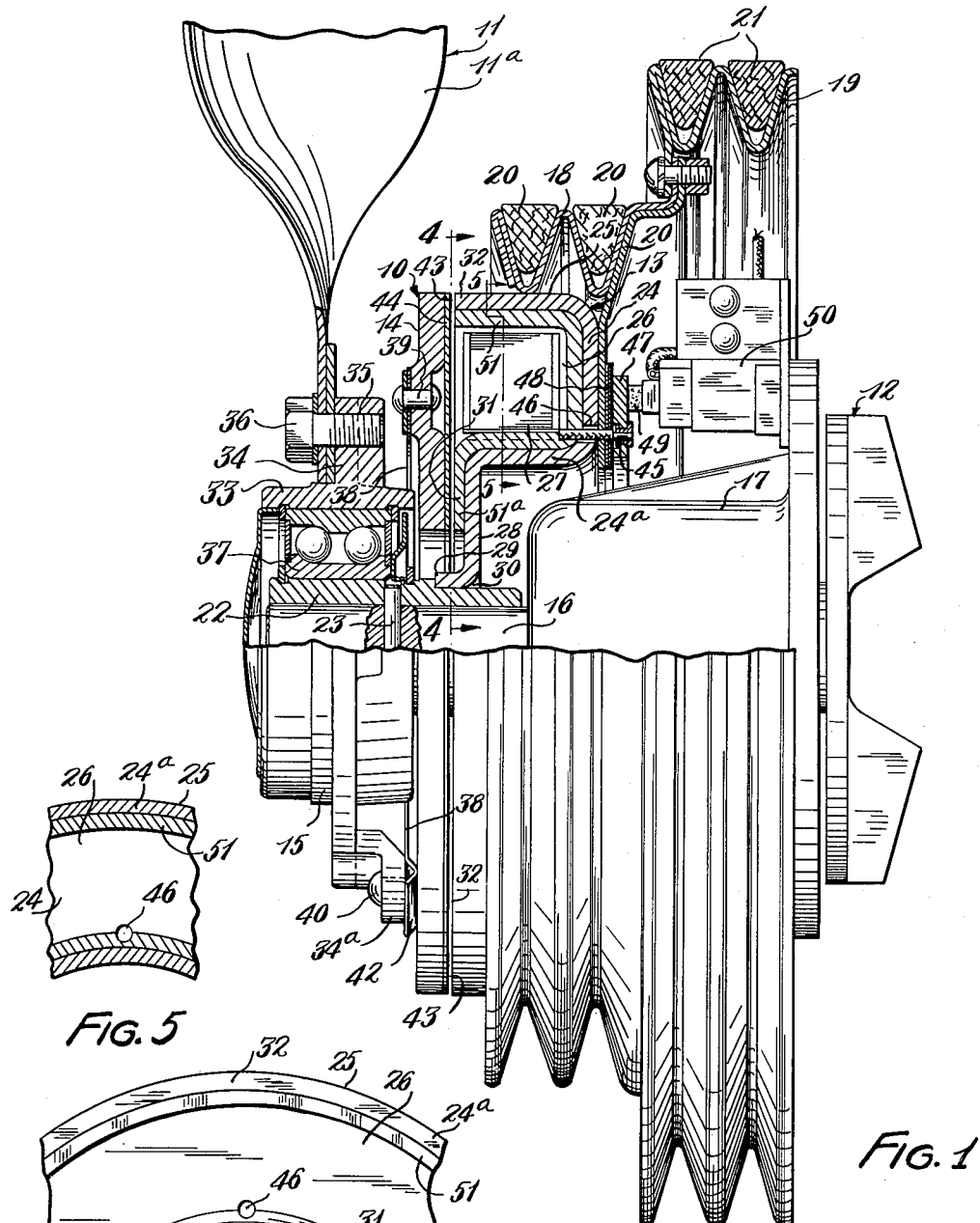
Fig. 1
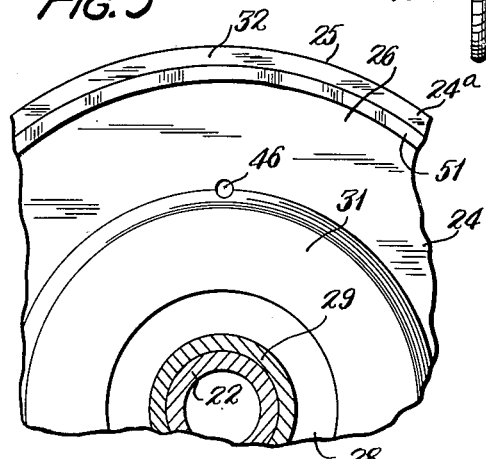
Fig. 5
Fig. 4
INVENTOR.
REYNOLD F. GAMUNDI
BY Hudson, Doughton,
Williams, David & Hoffmann
ATTORNEYS March 27, 1956  R. F. GAMUNDI  2,739,683
MAGNETIC DRIVE Filed Jan. 21, 1953  2 Sheets-Sheet 2

INVENTOR.
REYNOLD F. GAMUNDI
BY Hudson, Boughton,
Williams, David & Hoffmann
ATTORNEYS

United States Patent Office 2,739,683
Patented Mar. 27, 1956

2,739,683

MAGNETIC DRIVE

Reynold F. Gamundi, Mayfield Heights, Ohio, assignor to Eaton Manufacturing Company, Cleveland, Ohio, a corporation of Ohio Application January 21, 1953, Serial No. 332,191

10 Claims. (Cl. 192—84)

This invention relates to magnetic drive devices or clutches, and as one of its objects aims to provide a novel device of this kind which is of a simple and practical construction and in which the mounting means for the movable armature or clutch member embodies an effective vibration dampening means.

Another object is to provide a novel magnetic drive device in which the armature member is connected with a rotatable carrier member by resiliently flexible elements, such that movement of the armature member toward and from a magnet frame is accommodated by flexing of the flexible elements.

A further object is to provide a novel magnetic drive device of the character mentioned in which the resiliently flexible elements connecting the armature and carrier members have extension fingers or cantilever portions engaging one of the connected members, preferably the armature member.

Still another object is to provide a novel construction for such a magnetic drive device in which the connecting elements between the movable armature and its carrier constitute a group, preferably a polygonal group, of resilient strips disposed around the rotation axis in a radially edgewise relation, and in which extension portions of the strips bear against the armature and apply a vibration dampening force thereto.

As a further object, this invention provides a novel construction for a magnetic drive device in which the magnet frame comprises a sheet metal structure including an annular rim portion having an annular recess therein and annular pole portions on opposite sides of the recess.

Yet another object is to provide a novel magnetic drive device of the kind above referred to, in which the magnet frame is of formed sheet metal and is, at least in part, of double thickness sheet metal.

It is likewise an object of this invention to provide a magnetic drive device in which the sheet metal frame is of annular shape having radially spaced annular pole portions and in which at least the radially inwardly disposed annular pole portion is of double thickness sheet metal.

Additionally, this invention provides a novel magnetic drive device of the character mentioned, in which the annularly recessed portion of the magnet frame is formed by a double-thickness sheet metal rim portion and in which the armature is a plate ring of a radial width to span the annular recess of the magnet frame.

The invention can be further briefly summarized as consisting in certain novel combinations and arrangements of parts hereinafter described and particularly set out in the claims hereof.

In the accompanying sheets of drawings forming a part hereof:

Fig. 1 is a side elevation partially in longitudinal section, showing a magnetic drive device embodying this invention;

Fig. 4 is a partial transverse section taken at a point adjacent the magnet frame, substantially as indicated by section line 4—4 of Fig. 1;

Fig. 5 is a fragmentary transverse section taken through the magnet frame as indicated by section line 5—5 of Fig. 1.

Figure 2:
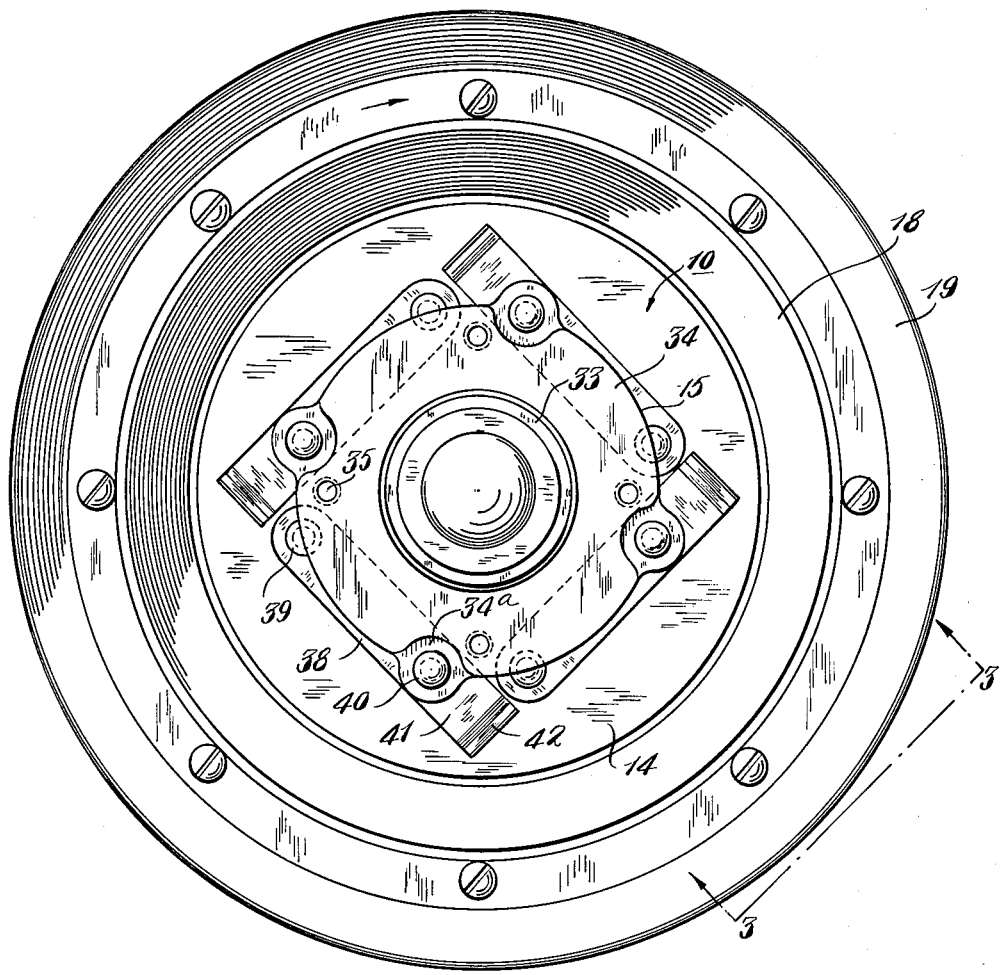
Fig. 2 is an end elevation of the drive device, but with the fan blades of the cooling fan omitted.

As one practical embodiment of this invention, the drawings show the novel magnetic coupling device 10 associated with the auxiliary devices of an internal combustion engine and which include an engine cooling fan 11 and the rotor 12 of a coolant circulating pump. The magnetic drive device 10 forms a part of a torque transmitting means by which driving torque is supplied to the fan 11 and the pump rotor 12 from the crankshaft or other power take-off of the engine.

The magnetic drive device 10 comprises, in general, a rotatable magnet unit 13, an armature member 14 and a rotatable carrier or hub 15 with which the armature 14 is connected. The magnet unit 13, the armature 14 and the hub 15 are all rotatable about the axis of the pump shaft 16 with which the rotor 12 is connected. The pump shaft 16 extends through, and is journalled for rotation in, a pump cover or housing section 17 which is adapted to be secured to the block of the engine. In the magnetic drive device 10, the magnet unit 13 is regarded as being the driving member while the armature member 14 and its carrier or hub 15 are regarded as being the driven member.

The magnetic drive device 10 also includes a pair of multiple groove sheet metal pulleys 18 and 19 which are mounted on a disk member 20 and connected with the magnet unit 13 by means of this disk member. The pulley 18 is driven from the power take-off or crankshaft of the engine by belt means 20, and the pulley 19 is connected with another auxiliary device to be driven, such as a generator, by belt means 21.

As shown in the drawings, the magnetic drive device 10 includes a mounting sleeve 22 disposed around the shaft 16 and secured to the latter by means of the transverse pin 23. The sleeve 22 forms a connecting means and carrier for the magnet unit 13 and the fan hub 15. The magnetic drive device 10 is adapted to be mounted on the pump shaft 16 by sliding the sleeve 22 onto the latter, after which the transverse pin 23 is inserted through aligned openings of the sleeve and shaft.

The magnet unit 13 comprises an annular magnet frame 24 having a rim portion 25 provided with an annular recess 26, and energizing coil means in the form of an annular magnet coil 27 disposed in the recess 26. The magnet frame 24 also comprises a disk portion 28 having a substantially central axial sleeve portion 29 disposed around and secured to the mounting sleeve 22 as by means of the weld 30. The magnet frame 24 also includes substantially radially spaced annular pole portions 31 and 32 located on opposite sides of the annular recess 26 and facing toward the hub or carrier 15.

The armature 14 is here shown as being a radially edgewise disposed annular plate member located adjacent the magnet frame 24 and lying substantially in a plane extending transversely to the axis of the mounting sleeve 22. The armature 14 is of a radial width to extend in spanning relation across the recess 26 of the magnet frame with inner and outer annular edge portions of the armature overlying the annular poles 31 and 32.

The armature carrier 15 is also the hub of cooling fan 11 and comprises an axial sleeve or bushing portion 33 and a substantially radial annular flange 34 formed integral with such sleeve portion and projecting therefrom. The flange portion 34 is provided with circumferentially spaced threaded openings 35 therein adapted to receive the threaded stems of clamping screws 36 by which the blades 11a of the cooling fan 11 are secured to the hub 15. The hub 15 is located in adjacent axially spaced relation to the magnet frame 24 with the armature 14 disposed therebetween and is mounted for rotation about the sleeve 22 by means of an antifriction bearing 37 interposed between the mounting sleeve and the sleeve portion 33 of the hub.

In accordance with an important feature of the novel magnetic coupling 10, the armature 14 is connected with the hub 15 for rotation therewith by means of a group of resiliently flexible connecting elements 38 which permit shifting of the armature toward and from the magnet frame 24 and also accomplish a vibration dampening action. The connecting elements 38 are in the form of resiliently flexible relatively thin metal strips which are disposed in an annular or polygonal group around the mounting sleeve 22 and which lie substantially in a plane extending transverse to the axis of the mounting sleeve at a point between the armature 14 and the hub 15. In this instance, the connecting members 38 are four in number and the polygonal shape defined thereby is that of a quadrangle or square.

The connecting members 38 are disposed in a radially edgewise relation and each have one end thereof secured to the armature 14 by means of a rivet 39 or the like. The connections formed by the rivets 39 lie substantially on a circle which is concentric with the axis of the mounting sleeve 22. The connecting members 38 are each connected at an intermediate point thereof with the radial flange 34 of the hub 15 by means of a rivet 40 or the like extending through radially projecting lugs or bosses 34a. The connections formed by the rivets 40 also lie on a circle which is substantially concentric with the axis of the mounting sleeve 22. The rivet circles for the rivets 39 and 40 are of substantially the same diameter as the outer peripheral edge of the radial flange 34.

The connecting members 38 are each provided with an extension portion or finger 41 which is here shown as being an end portion of such connecting member and which extends beyond the connection point represented by the rivet 40. The extension portions or fingers 41 of the connecting members 38 bear against the flat front surface 14a of the armature 14 in the manner of lever arm portions or cantilever portions of these connecting members. The extension fingers 41 are preferably provided adjacent the free end thereof with a rounded bearing portion 42 having the convex side thereof presented toward and pressing against the flat armature surface 14a.

The connecting members 38 form an annularly extending connecting means by which the armature 14 is connected with and mounted on the hub 15 for rotation therewith, and also provide for shifting of the armature axially of the mounting sleeve 22 toward and away from the magnet frame 24. During such movement of the armature toward the magnet frame, the connecting members 38 are subjected to flexing or bending in the intermediate portion thereof extending between the connecting rivets 39 and 40. The flexing of the connecting members 38 which is produced by movement of the armature toward the magnet frame 24, is a transverse bending of these connecting members which is distributed along the length thereof, and hence, is a bending which can be produced by even a relatively light actuating force or pull applied to the armature. In the device 10 this actuating force is the pull produced by the magnetic flux of the magnet unit 13.

When the coil 27 of the magnet unit 13 is energized, the flux passing through the magnet frame 24 will extend through the portion of the armature 14 which spans the poles 31 and 32 and will cause the armature to be suddenly pulled toward and into engagement with the poles of the magnet frame. This movement of the armature 14 into engagement with the magnet frame 24 is accommodated by the transverse flexing of the connecting members 38, as just described above. While the armature 14 remains in engagement with the poles of the magnet frame 24, the connecting members 38 are maintained in a bowed or flexed condition, but when the magnet unit 13 is deenergized, the connecting members act as plate springs and shift the armature away from the magnet frame and back to its position shown in the drawings and corresponding with a deenergized condition of the magnetic drive device 10.

During this return movement of the armature 14 the extension fingers 41 act as bumper elements which are engaged by and effectively locate the armature in its initial position and with an air gap 43 of a desired predetermined width between the armature and the poles of the magnet frame 24. In addition to serving as a connecting and mounting means for the armature member 14, the connecting members 38, and particularly the finger extensions 41, also exert a vibration dampening action on the armature by which this member is prevented from vibrating or fluttering during such times when it is not being clampingly held against the poles of the magnet frame 24 by the magnetic flux.

To overcome the effects of residual magnetism and to facilitate the separation of the armature 14 from the poles 31 and 32 of the magnet frame 24 when the coil 27 is deenergized, the armature is provided with a covering or lining 44 on the side thereof which is presented toward the magnet unit 13. The covering 44 is suitably secured to the inner face of the armature 14 and may be a metal covering formed by an annular sheet of non-magnetic material such as brass or bronze, but preferably is a lining of the composition disclosed in U. S. Patent 2,580,869 granted January 1, 1952.

In the magnetic drive device 10, the magnet unit 13 constitutes the driving member in regard to its relation to the hub 15 and this hub, together with the fan 11 and the armature 14, constitute the driven member. When the unit 13 has been magnetized by energization of the coil 27 and the armature 14 has been thereby engaged with the magnet frame 24, the hub 15 and the fan 11 carried thereby will then be connected with the rotating magnet unit and will be driven thereby. The force with which the armature 14 is held against the magnet frame 24 will depend upon the number of turns and extent of energization of the coil 27. When a relatively loose coupling effect is desired between the driving and driven members, the coil 27 is only partially energized or is energized with a relatively weak current and more or less relative rotary slipping will then be permitted to occur between the armature 14 and the magnet frame 24. On the other hand, when a relatively tight coupling effect is desired between the driving and driven members, the coil 27 is more strongly energized, whereupon only a minor amount of relative rotary slipping will be permitted between the armature 14 and the magnet frame 24.

Energizing current is supplied to the coil 27 through the lead 45 extending therefrom through an opening 46 of the magnet frame 24. The coil lead 45 is connected with a slip ring 47 which is mounted on the magnet unit 13 and insulated therefrom by the insulating ring 48. Energizing current from a suitable source, such as a vehicle battery, is delivered to the slip ring 47 through a brush 49 which projects from a suitable brush holder 50 and is slidably engaged by the slip ring 47.

In accordance with another feature of the present invention, the magnet frame 24 is made of sheet metal which is suitably formed to the desired shape by inexpensive stamping or drawing operations. The annular rim portion 25 of the magnet frame 24 is formed by double-thickness sheet metal portions which provide an aggregate transverse thickness for the portions of the magnet frame 24, such that the cross-sectional area of the magnet frame will provide a good permeability characteristic for a flow of flux through the magnet frame and from the pole portions 31 and 32 into the armature 14.

The double-thickness sheet metal portions are here shown as being formed by a channel-shaped annular portion 24a extending around and formed integral with the sheet metal disk 28 and a channel-shaped sheet metal member 51 nested in the annular recess of the channel-shaped sheet metal portion 24a. The inner annular edge of the nested sheet metal member 51 is extended inwardly toward the mounting sleeve 22 as a radial flange 51a which lies against the disk 28 and whose exposed surface forms the annular magnet pole 31. The annular pole portions 31 and 32 thus obtained on the magnet frame 24 by the double-thickness sheet metal construction, provide adequate pole area for effective cooperation of the magnet unit 13 with the armature 14.

With respect to the areas of the pole portions 31 and 32 of the sheet metal magnet frame 24, it will be observed that since the pole portion 32 lies at a greater radial distance from the mounting sleeve 22 than the pole portion 31, it will have a substantially greater annular length such that the annular end faces of the axially extending portions of the sheet metal frame members (see Fig. 1) will provide sufficient cross-sectional area and pole face area for the pole portion 32. The pole portion 31 which lies at a shorter radial distance will have a relatively shorter annular length, and hence, to provide this pole portion with the requisite cross-sectional area and pole face area, the inner edge of the frame member 51 is flared or extended radially inward as the annular flange 51a in overlying relation to the disk 28.

Figure 6:
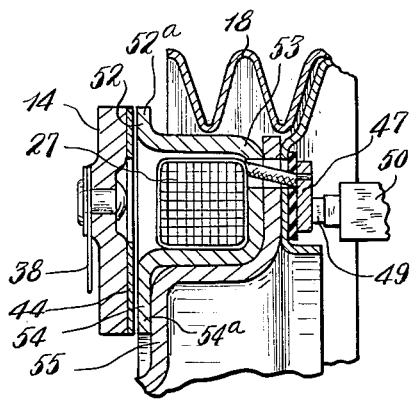
Fig. 6 is a fragmentary longitudinal section corresponding with a portion of Fig. 1 but showing a modified construction.
Figure 3:
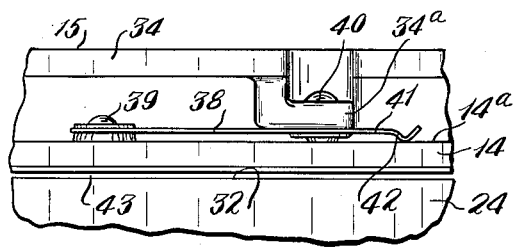
Fig. 3 is a fragmentary side elevation showing the connecting means between the movable armature and its carrier, the view being taken substantially as indicated by line 3—3 of Fig. 2.

In the modified magnet frame construction of Fig. 6, the outer annular pole portion 52 of the sheet metal magnet frame structure 53 is a single-thickness sheet metal pole portion formed by the radially outwardly flared annular wall portion 52a. The inner annular pole portion 54 is a double-thickness sheet metal pole portion formed by the radially inwardly flared annular wall portion 54a and the radial disk portion 55 against which it lies.

From the foregoing description and the accompanying drawings, it will now be readily understood that this invention provides a novel magnetic drive device of a simple and compact construction and which will be effective and reliable in operation. It will now also be understood that the extension portions of the flexible mounting means for the armature or clutch member effectively prevent vibration or fluttering of the armature. Additionally, it will be seen that this invention provides a novel and inexpensive double-thickness sheet metal construction for the magnet frame of a coupling device of this kind.

Although the magnetic coupling device of the present invention has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In a magnetic drive device, a rotatable magnet frame, coil means associated with said magnet frame and adapted to be electrically energized for supplying flux to said magnet frame, a rotatable carrier member adjacent said magnet frame, an armature member adjacent said magnet frame, and a plurality of resiliently flexible connecting elements connecting said armature member with said carrier member and providing for movement of said armature member relative to said magnet frame by flexing of said connecting elements, said connecting elements having extension portions engaging said armature member and applying vibration dampening pressure thereto at points spaced beyond the points of connection of said connecting elements with said armature member.

2. In a magnetic drive device, a pair of driving and driven members rotatable about a common axis and spaced apart in the direction of said axis, one of said members comprising an annular magnet frame and the other being a hub, coil means associated with said magnet frame for supplying flux thereto, an armature ring between said hub and magnet frame, and connecting means comprising an annular group of radially edgewise disposed resiliently flexible strips connecting said armature ring for rotation with said hub and providing for axial movement of said armature ring relative to said magnet frame by flexing of said strips, portions of said strips being deflected out of the general plane of said annular group and bearing against said armature ring at points spaced beyond the points of connection of said strips with said armature ring.

3. In a magnetic drive device, a rotatable magnet frame, coil means associated with said magnet frame and adapted to be electrically energized for supplying flux to said magnet frame, a rotatable carrier member adjacent said magnet frame, an armature member adjacent said magnet frame, a plurality of resiliently flexible elements connected at spaced points thereof with said armature and carrier members and providing for movement of said armature member relative to said magnet frame by flexing of said elements, and cantilever extensions on said flexible elements and engaging said armature member.

4. In a magnetic drive device, a rotatable annular magnet frame, electric coil means associated with said magnet frame for supplying flux thereto, a rotatable hub in adjacent substantially coaxially disposed relation to said magnet frame, an armature ring in adjacent substantially coaxial relation to said magnet frame, and a substantially coaxially disposed group of resiliently flexible connecting strips lying substantially in a transverse radial plane, said strips being connected at one end thereof with said hub and at an intermediate point thereof with said armature ring, portions of said strips at the opposite end thereof extending beyond said intermediate point and forming flexible fingers pressed against said armature ring.

5. A magnetic drive device as defined in claim 4 in which said fingers have convex bearing portions engaging said armature ring.

6. A magnetic drive device as defined in claim 4 in which the strips of said group are substantially polygonally disposed.

7. In a magnetic drive device, a pair of axially spaced driving and driven members rotatable about a common axis, one of said members comprising an annular magnet frame carrying coil means for producing flux therein and the other of said members being a hub, an annular armature plate surrounding said axis between said magnet frame and hub and rotatable with the latter, a polygonal group of substantially straight resiliently flexible connecting strips disposed in substantially radially edgewise relation and providing for axial movement of said armature plate toward and away from said magnet frame by flexing of said strips, means connecting said strips at one end thereof with said hub, and means connecting said strips at an intermediate point thereof with said armature plate, portions of said strips extending beyond the last-mentioned means and forming flexible pressure fingers engaging said armature plate.

8. In a magnetic drive device, a rotatable mounting sleeve, a pair of axially spaced driving and driven members rotatable about the axis of said sleeve, one of said members comprising an annular magnet frame connected with said sleeve for rotation therewith and the other member being a hub rotatable on said sleeve, a plate ring armature surrounding said sleeve between said magnet frame and hub and rotatable with the latter, an annular group of resiliently flexible connecting strips disposed in substantially radially edgewise relation and providing for axial movement of said armature plate toward and away from said magnet frame by flexing of said strips, means connecting said strips at one end thereof with said hub, and means connecting said strips at an intermediate point thereof with said armature plate, portions of said strips at the opposite end thereof extending beyond said intermediate point and forming flexible pressure fingers engaging said armature plate.

9. In a magnetic drive device, a pair of relatively rotatable driving and driven members disposed in substantially coaxial relation, one of said members comprising a sheet metal annular magnet frame portion having an annular recess therein and radially spaced inner and outer annular pole portions presenting annularly continuous pole faces on opposite sides of such recess and the other of said members being a carrier, an armature ring adjacent said annular magnet frame portion, connecting means connecting said armature ring with said carrier for rotation with the latter and providing for axial shifting of said armature ring relative to said magnet frame portion, said inner annular pole portion being of double-thickness sheet metal for increased strength and pole face area, the double-thickness sheet metal of said inner annular pole portion comprising substantially radially inwardly extending annularly continuous wall portions of said sheet metal magnet frame portion.

10. In a magnetic drive device, a pair of relatively rotatable driving and driven members disposed in substantially coaxial relation, one of said members comprising a magnet frame and the other being a carrier, an armature ring adjacent said magent frame, flexible sheet metal strip connecting means connecting said armature ring with said carrier for rotation with the latter and providing for axial shifting of said armature ring relative to said magnet frame, said one member also comprising a hub and a radial annular sheet metal disk portion connected with said hub and carrying a right-angularly disposed axial annular wall portion which is integrally connected with said disk portion around the periphery thereof, said magnet frame comprising a formed annular sheet metal rim part carried by said disk portion, said rim part defining an axially facing annular recess having radially spaced inner and outer axial annular side walls and a pair of radially spaced substantially continuous inner and outer annular pole face portions on opposite sides of said recess, and an energizing coil in said annular recess, the portions of said rim part defining said inner annular axial side wall and said inner annular pole face portion being integrally connected with each other in a substantially right-angularly disposed relation with said inner annular pole face portion lying against said disk portion to form therewith a double sheet metal thickness and said inner axial side wall lying against said right-angularly disposed annular wall portion to form with the latter a double sheet metal thickness.

References Cited in the file of this patent

UNITED STATES PATENTS

| | | |
|---|---|---|
| 1,622,261 | Payne | Mar. 22, 1927 |
| 1,914,490 | Dodge | June 20, 1933 |
| 1,989,984 | Hope | Feb. 5, 1935 |
| 2,395,772 | Winther | Feb. 26, 1946 |
| 2,589,308 | Thelander | Mar. 18, 1952 |
| 2,703,378 | Harter | Mar. 1, 1955 |